US009711874B2

(12) United States Patent
Hanazaki

(10) Patent No.: US 9,711,874 B2
(45) Date of Patent: Jul. 18, 2017

(54) TERMINAL AND MANUFACTURING METHOD OF TERMINAL

(75) Inventor: Hisashi Hanazaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 212 days.

(21) Appl. No.: 14/234,404

(22) PCT Filed: Jul. 19, 2012

(86) PCT No.: PCT/JP2012/004594
§ 371 (c)(1), (2), (4) Date: Apr. 10, 2014

(87) PCT Pub. No.: WO2013/014887
PCT Pub. Date: Jan. 31, 2013

(65) Prior Publication Data

US 2014/0308014 A1 Oct. 16, 2014

(30) Foreign Application Priority Data

Jul. 25, 2011 (JP) ................................ 2011-162006

(51) Int. Cl.
*H01R 4/18* (2006.01)
*H02G 3/06* (2006.01)
(Continued)

(52) U.S. Cl.
CPC ............... *H01R 9/11* (2013.01); *H01R 4/184* (2013.01); *H01R 43/04* (2013.01); *H01R 43/048* (2013.01);
(Continued)

(58) Field of Classification Search
CPC ...... H02G 15/013; H01R 43/048; H01R 4/20; H01R 13/5205; H01R 4/10; H01R 4/18;
(Continued)

(56) References Cited

U.S. PATENT DOCUMENTS

| | | | | |
|---|---|---|---|---|
| 2,554,813 A * | 5/1951 | Buchanan | ............ | H01R 43/058 439/879 |
| 2,596,528 A * | 5/1952 | Carlson | .................. | H01R 4/184 439/868 |
| 2,692,422 A * | 10/1954 | Pierce | .................. | H01R 43/058 174/90 |

(Continued)

FOREIGN PATENT DOCUMENTS

| | | |
|---|---|---|
| JP | S48-25885 A | 4/1973 |
| JP | 2005-327690 A | 11/2005 |
| JP | 2010-118347 A | 5/2010 |

OTHER PUBLICATIONS

Chinese office action letter issued on Jun. 23, 2015 in the counterpart Chinese patent application.
Japanese office action letter issued on Feb. 3, 2015 in the counterpart Japanese patent application Korean office action letter issued on Mar. 18, 2015 in the counterpart Korean patent application.
German office action issued on Jul. 27, 2016 in the counterpart German patent application.

*Primary Examiner* — Timothy Thompson
*Assistant Examiner* — Guillermo Egoavil
(74) *Attorney, Agent, or Firm* — Mots Law, PLLC

(57) ABSTRACT

A terminal (10) is to be connected to an electric wire (W) which includes a core wire made of a fiber conductor (1). In a state of inserting a bare part of the fiber conductor in a barrel portion (11) of the terminal, the barrel portion is swaged while a swage amount is gradually increased as progressing in an electric wire insertion direction, which gradually expands the barrel portion in a width direction (D).

10 Claims, 7 Drawing Sheets

(51) Int. Cl.
*H02G 15/08* (2006.01)
*H01R 9/11* (2006.01)
*H01R 43/048* (2006.01)
*H01R 43/04* (2006.01)

(52) U.S. Cl.
CPC .... *Y10T 29/49204* (2015.01); *Y10T 29/49218* (2015.01)

(58) Field of Classification Search
CPC .......... H01R 4/62; H01R 4/184; H01R 4/188; H01R 4/203; H01R 4/2495; H01R 9/11; H01R 43/04; Y10T 29/49204; Y10T 29/49218
USPC ....... 439/877, 874, 865, 442, 730, 868, 882; 174/74 R, 84 C, 90; 29/874, 882; 385/101
See application file for complete search history.

(56) References Cited

U.S. PATENT DOCUMENTS

| | | | | |
|---|---|---|---|---|
| 2,934,128 | A * | 4/1960 | Pellier | H01R 11/11 29/863 |
| 3,076,256 | A | 2/1963 | Broske | |
| 3,805,221 | A | 4/1974 | Kuo | |
| 3,897,992 | A | 8/1975 | Weidler | |
| 3,955,044 | A | 5/1976 | Hoffman et al. | |
| 3,956,823 | A | 5/1976 | Kuo | |
| 2007/0184715 | A1 * | 8/2007 | Onuma | H01R 4/04 439/587 |
| 2010/0120288 | A1 | 5/2010 | Drew et al. | |

* cited by examiner

[Fig. 1]
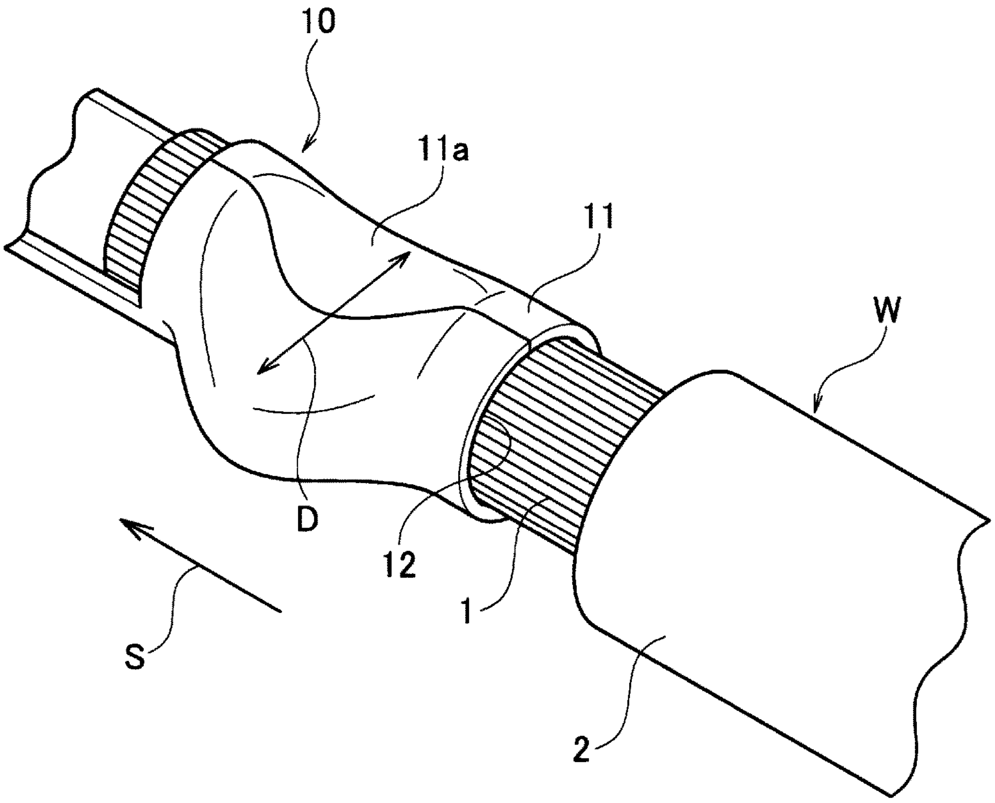

[Fig. 2A]
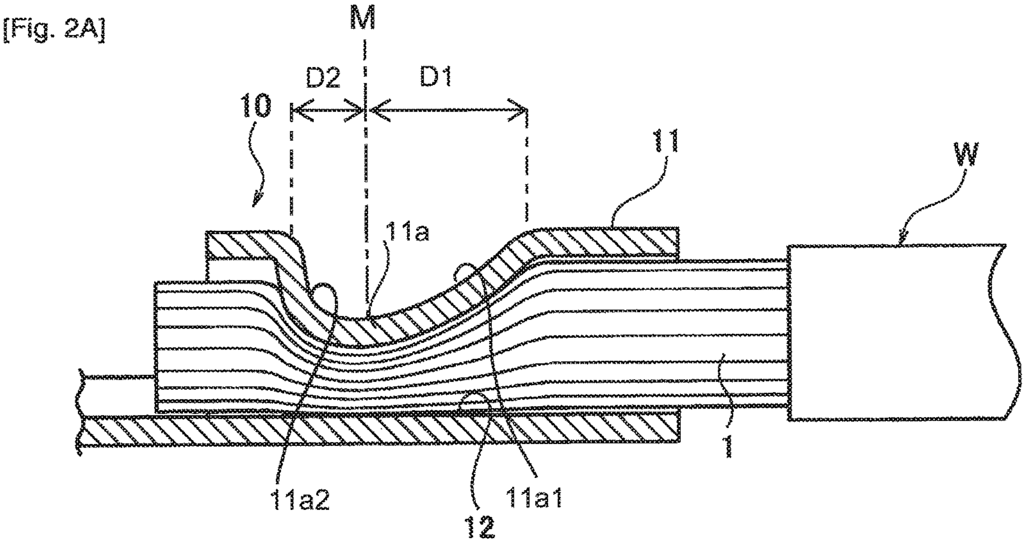
[Fig. 2B]
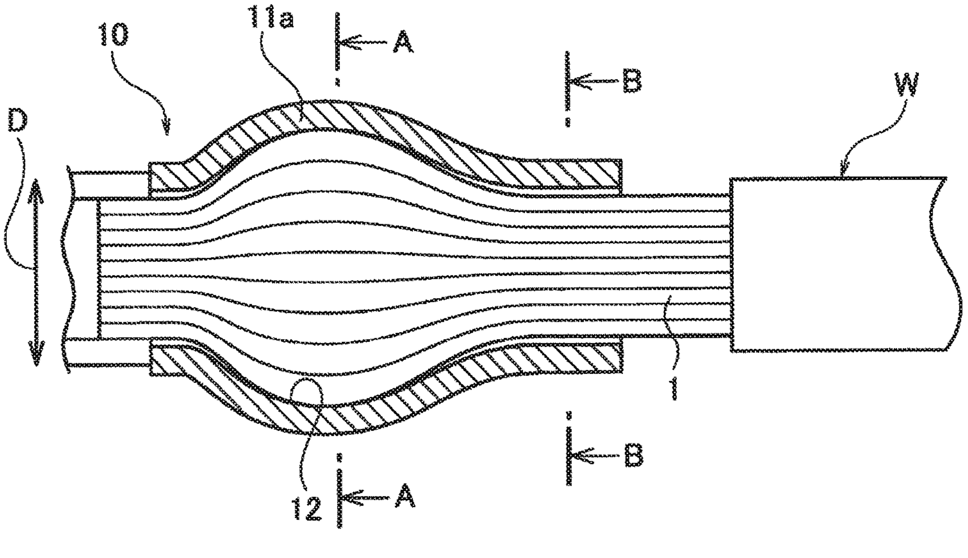

[Fig. 3A]
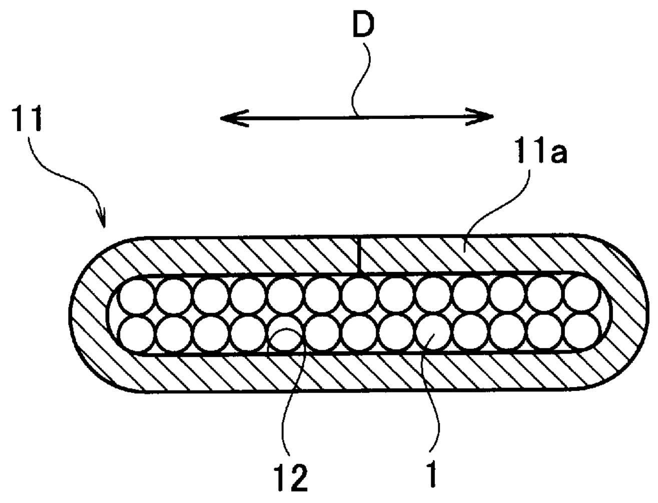
[Fig. 3B]
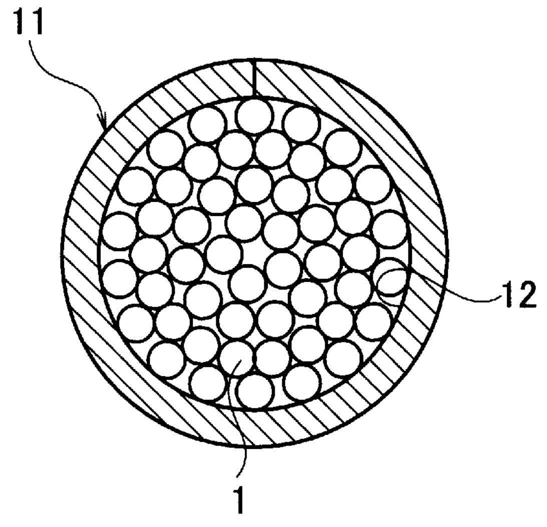

[Fig. 4A]
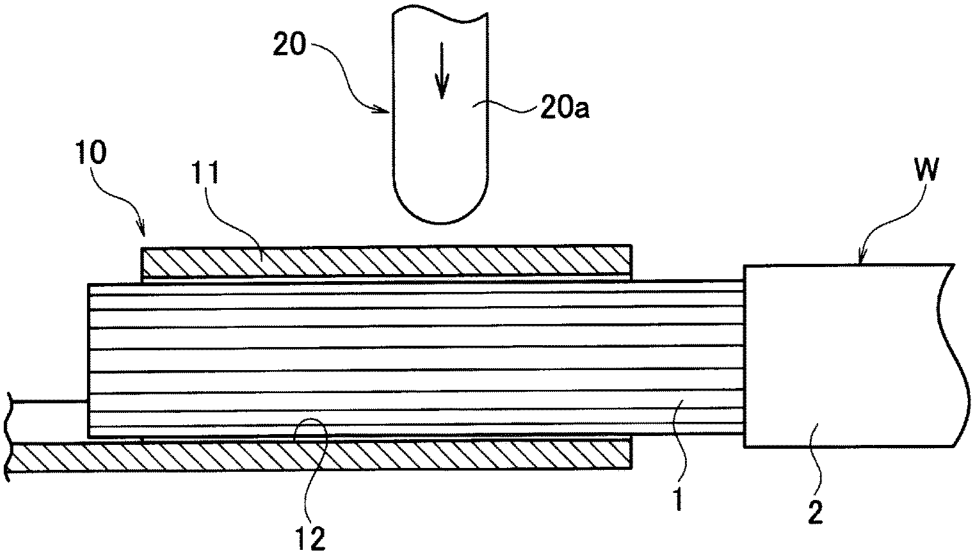
[Fig. 4B]
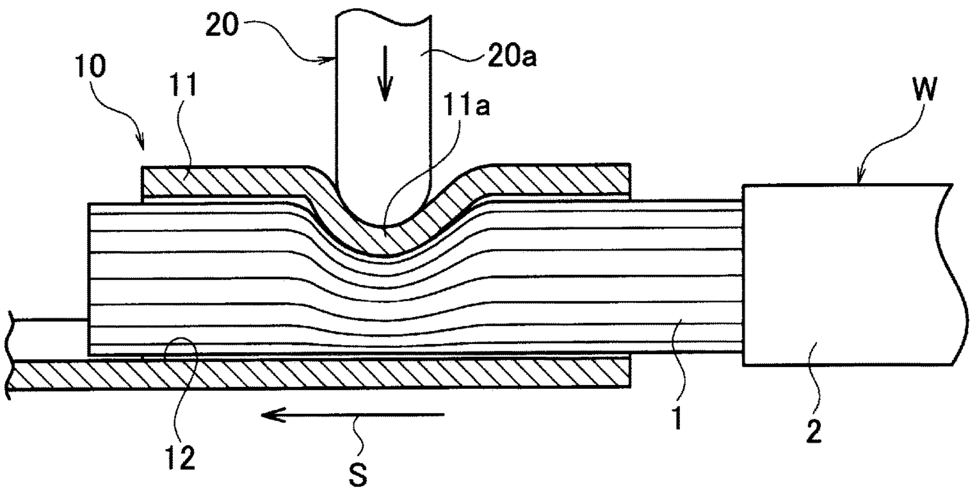

[Fig. 4C]
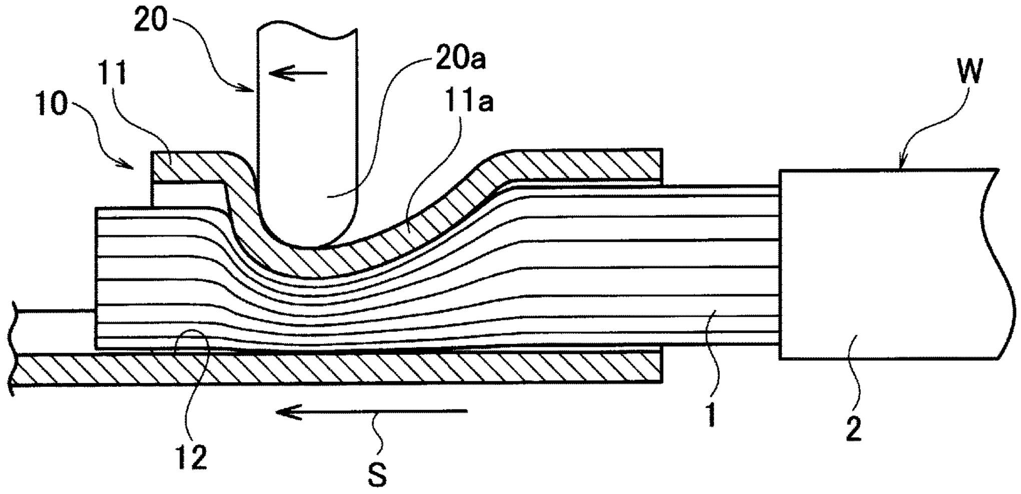
[Fig. 5]
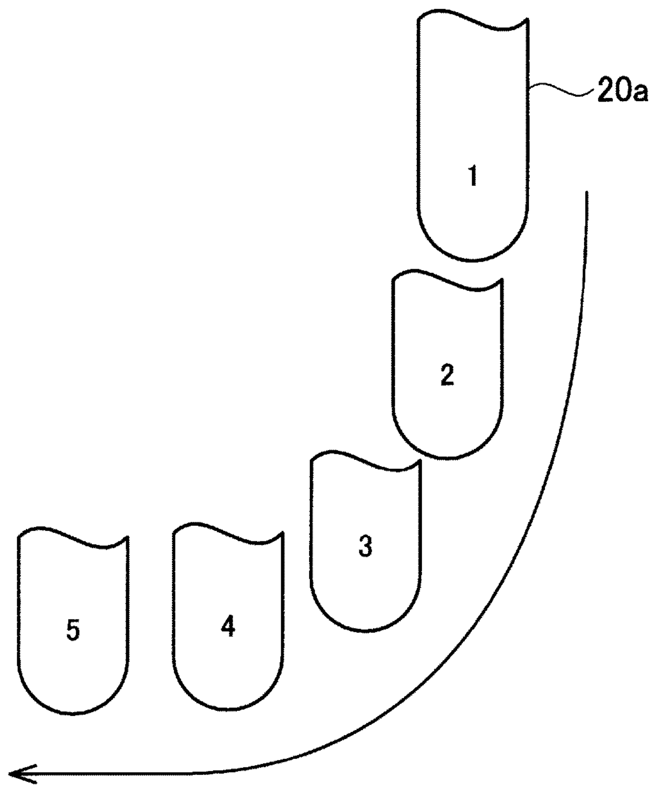

[Fig. 6]
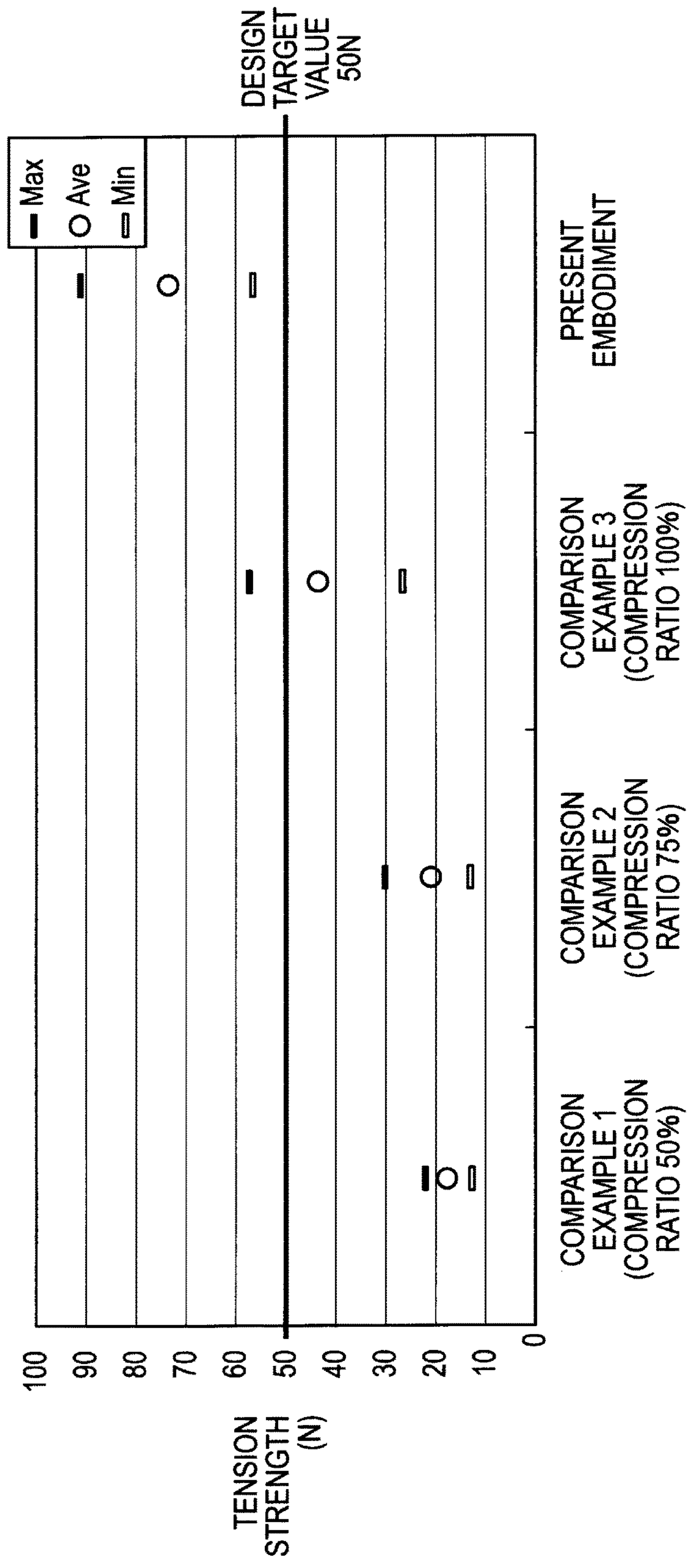

[Fig. 7]
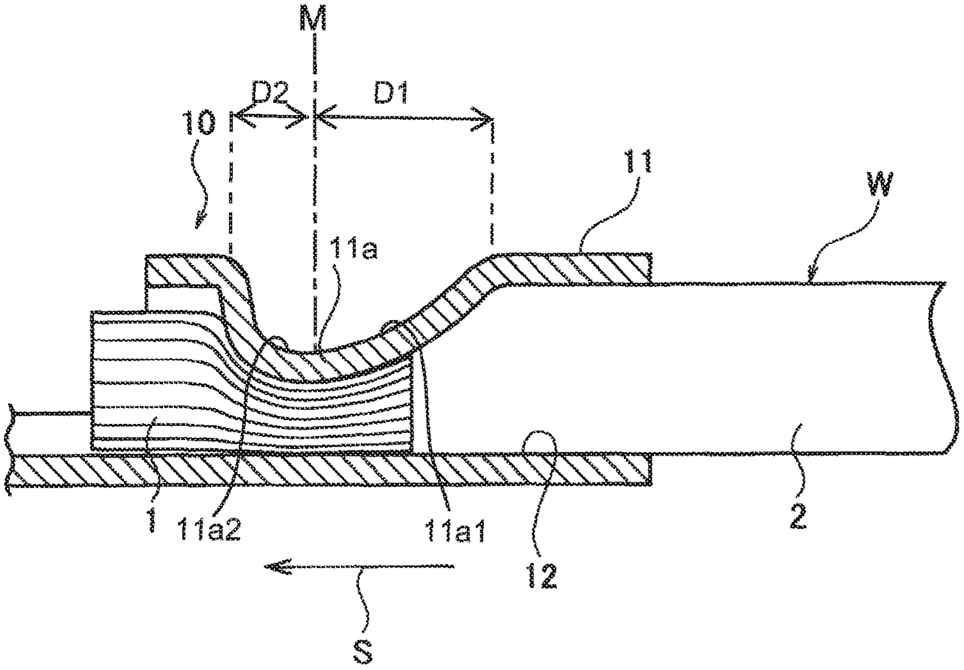

TERMINAL AND MANUFACTURING METHOD OF TERMINAL

TECHNICAL FIELD

The present invention relates to a terminal to be connected to an electric wire which includes a core wire made of a fiber conductor therein, and a manufacturing method of the terminal.

BACKGROUND ART

As a terminal to be connected to an electronic wire, various types in which a barrel portion of a terminal is swaged to secure a core wire of an electric wire using compress force have been proposed (e.g., Patent Literature 1). Shear force acts on a core wire of an electric wire in swage processing. If the core wire is made of copper or aluminum, there is no possibility that the core wire suffers damage such as adverse affect (e.g., break of conductor) for electric characteristics at a connection portion by shear force in the swage processing of the barrel portion.

There is an electric wire in which a core wire is made of a fiber conductor. The fiber conductor is formed by twisting fibers whose surfaces are subject to plate processing, and forms a core wire of an ultrafine electric wire. Because of this, the electric wire in which the core wire is made of a fiber conductor has superior weight saving, superior tension strength and superior flexure.

CITATION LIST

Patent Literature

[PTL1]

Japanese Patent Application Laid-Open Publication No. 2010-118347

SUMMARY OF INVENTION

Technical Problem

The fiber conductor however has low shear strength because each fiber in the fiber conductor has a fine dimension. Because of this, when a barrel portion of a terminal is swaged to be compress-connected to the fiber conductor as well as the core wire made of copper or aluminum, this causes break of fiber to reduce mechanical strength at a connection portion.

Patent Literature 1 describes a configuration where a barrel portion is divided into parts and a swage deformation amount of each divided part of the barrel portion is variable. However, in a connection portion having the largest swage deformation amount, large shear force acts on a boundary in the connection portion to cause break of fiber, which reduces mechanical strength at the connection portion.

The present invention is made to resolve the above-described problem, and an object of the present invention is to provide a terminal to be connected to an electronic wire in which a core wire is made of a fiber conductor, having high mechanical strength at a connection portion where the terminal is to be connected to an electric wire, and a manufacturing method of the terminal.

Solution to Problem

According to a first aspect of the present invention, there is provided a terminal to be connected to an electric wire which includes a core wire made of a fiber conductor, including a barrel portion in which the fiber conductor is to be inserted, wherein in a state of inserting a bare part of the fiber conductor in the barrel portion, the barrel portion is swaged while a swage amount is gradually increased as progressing in an electric wire insertion direction, which gradually expands the barrel portion in a width direction.

According to a second aspect of the present invention, the bare part of the fiber conductor and a covering part of the fiber conductor are inserted in the barrel portion, and the bare part and the covering part of the fiber conductor are compressed to be connected to the terminal by a swage deformation of the barrel portion.

According to a third aspect of the present invention, there is provided a manufacturing method of a terminal including: arranging a bare part of a fiber conductor of an electric wire in a barrel portion of the terminal; and swaging the barrel portion while a swage amount is gradually increased as progressing in an electric wire insertion direction, which gradually expands the barrel portion in a width direction.

According to a fourth aspect of the present invention, the arranging arranges the bare part of the fiber conductor and a covering part of the fiber conductor in the barrel portion, and the swaging compresses the bare part and the covering part of the fiber conductor to connect both parts to the terminal by a swage deformation of the barrel portion.

Advantageous Effects of Invention

According to the present invention, the fiber conductor is swaged while a swage amount is gradually increased as progressing in an electric wire insertion direction, which gradually loosens the fiber conductor in the barrel portion in the width direction as progressing in the electric wire insertion direction. At this time, fibers of the fiber conductor 1 are loosened in the width direction by flexibility and tension strength of the fibers without being broken. Thus, since the fiber conductor at a swage deformation portion of the terminal is loosened depending on a swage amount of the barrel portion, compression stress from the barrel portion does not concentrate at one portion in the fiber conductor. Therefore, only small shear force acts on the fiber conductor, and each fiber of the fiber conductor is not broken by compression force from the barrel portion. This improves mechanical strength at the connection portion where the terminal is to be connected to the electric wire which includes the core wire made of the fiber conductor therein.

BRIEF DESCRIPTION OF DRAWINGS

FIG. 1 is a perspective view of a terminal that is compressed to be connected to a fiber conductor, according to a first exemplary embodiment of the present invention.

FIG. 2A is a vertical cross-section view of the terminal that is compressed to be connected to the fiber conductor, according to the first exemplary embodiment of the present invention.

FIG. 2B is a transverse cross-section view of the terminal that is compressed to be connected to the fiber conductor, according to the first exemplary embodiment of the present invention.

FIG. 3A is a cross-section view along the line A-A in FIG. 2B.

FIG. 3B is a cross-section view along the line B-B in FIG. 2B.

FIG. 4A is a cross-section view that illustrates a compress-connection process according to the first exemplary embodiment of the present invention.

FIG. 4B is a cross-section view that illustrates the compress-connection process according to the first exemplary embodiment of the present invention.

FIG. 4C is a cross-section view that illustrates the compress-connection process according to the first exemplary embodiment of the present invention.

FIG. 5 is a diagram that illustrates a movement locus of an upper swaging tool according to the first exemplary embodiment of the present invention.

FIG. 6 is a diagram that illustrates measured data of tension strength with respect to conventional terminals and the terminal according to the first exemplary embodiment of the present invention.

FIG. 7 is a vertical cross-section view of a terminal that is compressed to be connected to a fiber conductor, according to the second exemplary embodiment of the present invention.

DESCRIPTION OF EMBODIMENTS

Exemplary embodiments of the present invention will be described below with reference to accompanying drawings.

FIGS. 1 to 5 illustrate a first exemplary embodiment of the present invention. As shown in FIGS. 1 to 2B, an electric wire W includes a core wire made of a fiber conductor 1 therein. The outer periphery of the fiber conductor 1 is covered with an insulating covering portion 2. The fiber conductor 1 is formed by twisting fibers whose surfaces are subject to plate processing using conductive material. The electric wire W has an end portion from which a part of the insulating covering portion 2 is peeled to expose a part of the fiber conductor 1. The exposed part of the fiber conductor 1 (a bare part of the fiber conductor 1) is inserted into a barrel portion 11 from an electric wire insertion direction S.

A terminal 10 is made of conductive material. The terminal 10 integrally includes a terminal connection portion (not shown) to which an associated terminal is to be connected, and the barrel portion 11 to which the electric wire W is to be connected. The barrel portion 11 is formed in a cylindrical shape before being subject to swage processing, and has an electrical wire insertion hole 12 therein. Thus, the barrel portion 11 has a closed barrel configuration and a first end opening (the right end of the barrel portion in FIGS. 2A and 2B) and a second end opening (the left end of the barrel portion in FIGS. 2A and 2B) provided at the opposite side of the first end opening. The electric wire W is inserted into the barrel portion from the first end opening. The barrel portion 11 is swaged with swage force from an upper surface side to have a swage deformation portion 11*a* which is formed by flattening the cylindrical shape thereof. The width of the swage deformation portion 11*a* is not uniformed at each position in the electric wire insertion direction S and gradually increases as progressing in the electric wire insertion direction S. The electric wire insertion hole 12 is gradually deformed in a long elliptical shape as progressing in the electric wire insertion direction S. Thereby, a part of the fiber conductor 1 inserted in the electric wire insertion hole 12 is loosened in a width direction D to have a spread state as progressing in the electric wire insertion direction S, and is compress-connected to the barrel portion 11. As shown in FIG. 3B, a portion other than the swage deformation portion 11*a* of the barrel portion 11 has a circular cross-section, and the fiber conductor 1 at the portion is circularly bundled. In contrast, as shown in FIG. 3A, the swage deformation portion 11*a* of the barrel portion 11 has a long elliptical cross-section, and the fiber conductor 1 at the swage deformation portion 11*a* is loosened in a horizontal direction. That is, as shown in FIG. 2A, the swaged deformation portion 11*a* has: a maximum swage amount portion M where a swage amount and a width are at a maximum, that is, reach a maximum value in the swage portion 11*a*; a first part 11*a*1, which is close to the first end opening with respect to a maximum swaged amount portion M; and a second part 11*a*2, which is close to the second end opening with respect to the maximum swaged amount portion M. The maximum swage amount portion M is a boundary between the first part 11*a*1 and the second part 11*a*2. A swage amount of the first part 11*a*1 of the swaged portion 11*a* is gradually increased and a width of the first part 11*a*1 of the swaged portion 11*a* gradually expands in an electric wire insertion direction toward the maximum swaged amount portion M and a swage amount of the second part 11*a*2 of the swaged portion 11*a* is gradually decreased and a width of the second part 11*a*2 of the swaged portion 11*a* gradually decreases in the electric wire insertion direction apart from the maximum swaged amount portion M. The length D1 of the first part 11*a*1 is greater than the length D2 of the second part 11*a*2 in the electric wire insertion direction S.

Next, a barrel swaging tool 20 will be described. The barrel swaging tool 20 includes a lower swaging tool (not shown) supporting a lower side of the barrel portion 11 of the terminal 10 and an upper swaging tool 20*a* arranged above the lower swaging tool. The lower swaging tool has a terminal placement surface where the terminal 10 is to be placed, and restricts a movement of the terminal 10 in the electric wire insertion direction S on the terminal placement surface. The lower swaging tool allows the barrel portion 11 to freely deform in the width direction D on the terminal placement surface. The upper swaging tool 20*a* has a circular surface at a lower end portion thereof. The upper swaging tool 20*a* can move with respect to the lower swaging tool, and is set to conduct a circular movement in order of 1→2→3→4→5 as shown in FIG. 5. By the circular movement, the upper swaging tool 20*a* swages an upper surface side of the barrel portion 11 such that swage force gradually increases as progressing in the electric wire insertion direction S.

Next, processing for connecting the electric wire W to the terminal 10 will be described. First, as shown in FIG. 4A, the terminal 10 is placed on the terminal placement surface of the lower swaging tool of the barrel swaging tool 20, and the exposed part of the fiber conductor 1 (the bare part of the fiber conductor 1) at the end portion of the electric wire W is inserted into the barrel 11 of the terminal 10 (an electric wire setting process).

Next, as shown in FIGS. 4B and 4C, the upper swaging tool 20*a* of the barrel swaging tool 20 is moved to cause swage force (compression force) to act on the upper surface side of the barrel portion 11. The swaging movement of the upper swaging tool 20*a* is carried out more than once while a swage amount is gradually increased in the electric wire insertion direction S in each step (a barrel swaging process). Thus, the barrel portion 11 is swaged while a swage amount is gradually increased in the electric wire insertion direction S, which gradually expands the barrel portion 11 in the width direction D as progressing in the electric wire insertion direction S. Thereby, the processing is completed.

In the barrel swaging process, the barrel portion 11 is swaged (flattened) while a swage amount is gradually increased as progressing in the electric wire insertion direction S. This gradually deforms the electric wire insertion hole 12 in a long elliptical shape as progressing in the electric wire insertion direction S. With the deformation of the electric wire insertion hole 12 into the long elliptical shape, the fiber conductor 1 at the swage deformation portion 11*a* is gradually loosened in the width direction D as progressing in the electric wire insertion direction S (a loosening state). At this time, fibers of the fiber conductor 1 are loosened in the width direction D by flexibility and tension strength of the fibers without being broken. Thus, since the fiber conductor 1 at the swage deformation portion 11*a* is loosened depending on a swage amount (flattening amount) of the barrel portion 11, compression stress from the barrel portion 11 does not concentrate at one portion in the fiber conductor 1. Therefore, only small shear force acts on the fiber conductor 1, and each fiber of the fiber conductor 1 is not broken by compression force from the barrel portion 11. This improves mechanical strength at the connection portion where the terminal 10 is to be connected to the electric wire W which includes the core wire made of the fiber conductor 1 therein.

FIG. 6 shows a data result in which tension strength of each electric wire W is measured with respect to the terminal 10 in the present embodiment and conventional terminals in comparison examples 1 to 3. In the comparison examples 1 to 3, a fiber conductor 1 of an electric wire W is compress-connected to a barrel portion 11 of each conventional terminal by swage processing based on the conventional example. In the comparison example 1, a compression ratio is 50%. In the comparison example 2, a compression ratio is 75%. In the comparison example 3, a compression ratio is 100%. It is noted that the compression ration means a ratio of a cross-sectional area of fiber conductor 1 to a cross-sectional area in a barrel portion 11 after being subject to swage processing. As shown in FIG. 6, in the comparison examples 1 to 3, a value of tension strength of electric wire W falls below a design target value (50N). In contrast, in the present embodiment, even a minimum measured value of tension strength of electric wire W exceeds the design target value.

FIG. 7 illustrates a second exemplary embodiment of the present invention. In FIG. 7, an exposed part of the fiber conductor 1 (a bare part of the fiber conductor 1) and a part of the insulating covering portion 2 (a covering part of the fiber conductor 1) are inserted into the barrel portion 7. By swage processing, the exposed part of the fiber conductor 1 is swaged together with the part of the insulating covering portion 2.

Since other elements are the same as the first exemplary, the same symbols are assigned to the same portion in the drawing and the descriptions thereof are omitted.

In the present embodiment, this configuration improves mechanical strength at the connection portion where the terminal 10 is to be connected to the electric wire W which includes the core wire made of the fiber conductor 1 therein, as well as the first exemplary embodiment.

Especially, in the present embodiment, the exposed part of the fiber conductor 1 and the part of the insulating covering portion 2 are swaged simultaneously. Therefore, since tension force of the electric wire W is received by the part of the insulating covering portion 2 in addition to the exposed part of the fiber conductor 1, tension strength of the electric wire W is further improved.

REFERENCE SIGNS LIST

W electric wire
1 fiber conductor
2 insulating covering portion
10 terminal
11 barrel portion

The invention claimed is:

1. A terminal to be connected to an electric wire which includes a core wire made of a fiber conductor, comprising:

a barrel portion in which the fiber conductor is to be inserted, wherein the barrel portion includes a first end opening and a second end opening, wherein a bare part of the fiber conductor is to be inserted into the barrel portion from the first end opening, and a swaged portion between the first end opening and the second end opening, wherein the swaged portion is swaged in a state of inserting the bare part of the fiber conductor in the barrel portion such that the swaged portion has a maximum swaged amount portion where a swage amount and a width are at a maximum in the swaged portion, a first part close to the first end opening with respect to the maximum swaged amount portion and a second part close to the second end opening with respect to the maximum swaged amount portion, such that a swage amount of the first part of the swaged portion is gradually increased and a width of the first part of the swaged portion gradually expands in an electric wire insertion direction toward the maximum swaged amount portion and a swage amount of the second part of the swaged portion is gradually decreased and a width of the second part of the swaged portion gradually decreases in the electric wire insertion direction apart from the maximum swaged amount portion, wherein a length of the first part is greater than a length of the second part in the electric wire insertion direction.

2. The terminal according to claim 1, wherein the bare part of the fiber conductor and a covering part of the fiber conductor are inserted in the barrel portion, and the bare part and the covering part of the fiber conductor are compressed to be connected to the terminal by a swage deformation of the barrel portion.

3. A manufacturing method of a terminal comprising:

arranging a bare part of a fiber conductor of an electric wire in a barrel portion of the terminal having a first end opening and a second end opening, wherein the bare part of the fiber conductor is inserted from the first end opening of the barrel portion; and forming a swaged portion by swaging the barrel portion having a maximum swaged amount portion where a swage amount and a width are at a maximum in the swaged portion, a first part of the swaged portion close to the first end opening with respect to the maximum swaged amount portion and a second part of the swaged portion close to the second end opening with respect to the maximum swaged amount portion, such that a swage amount of the first part of the swaged portion is gradually increased and a width of the first part of the swaged portion gradually expands in an electric wire insertion direction toward the maximum swaged amount portion and a swage amount of the second part of the swaged portion is gradually decreased and a width of the second part of the swaged portion gradually decreases in the electric wire insertion direction apart from the maximum swaged amount portion, wherein a length of the first part is greater than a length of the second part in the electric wire insertion direction.

4. The manufacturing method according to claim 3, wherein the arranging arranges the bare part of the fiber conductor and a covering part of the fiber conductor in the barrel portion, and the swaging compresses the bare part and the covering part of the fiber conductor to connect both parts to the terminal by a swage deformation of the barrel portion.

5. The terminal according to claim 1, wherein a portion of the barrel portion closer to the second end opening than the swaged portion is not swaged.

6. The manufacturing method according to claim 4, wherein the forming step leaves a portion of the barrel portion closer to the second end opening than the swaged portion not swaged.

7. The terminal according to claim 1, wherein a portion of the barrel portion closer to the first end opening is not swaged.

8. The terminal according to claim 1, wherein a first end portion of the barrel portion closer to the first end opening is not swaged, and a second end portion of the barrel portion closer to the second end opening is not swaged.

9. The terminal according to claim 1, wherein an inclination of the upper surface of the first part of the swaged portion with respect to the an axis of the barrel portion gradually decreases to the maximum swaged amount portion in the electric wire insertion direction.

10. The terminal according to claim 1, wherein an upper surface side of the first part of the swaged portion circularly curves to the maximum swaged amount portion in the electric wire insertion direction.

* * * * *